US008813483B2

(12) United States Patent
Maienschein (10) Patent No.: US 8,813,483 B2
(45) Date of Patent: Aug. 26, 2014

(54) HYDRODYNAMIC TORQUE CONVERTER WITH TORSION VIBRATION DAMPER

(75) Inventor: Stephan Maienschein, Baden-Baden (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 113 days.

(21) Appl. No.: 13/460,937

(22) Filed: May 1, 2012

(65) Prior Publication Data
US 2012/0210707 A1 Aug. 23, 2012

Related U.S. Application Data

(63) Continuation of application No. PCT/DE2010/001230, filed on Oct. 18, 2010.

(30) Foreign Application Priority Data

Nov. 9, 2009 (DE) .......................... 10 2009 052 295
Jul. 15, 2010 (DE) .......................... 10 2010 027 255

(51) Int. Cl.
*F16H 45/02* (2006.01)
*F16H 41/24* (2006.01)

(52) U.S. Cl.
USPC .......................................................... 60/338

(58) Field of Classification Search
USPC .................................................. 60/330, 338
See application file for complete search history.

(56) References Cited

U.S. PATENT DOCUMENTS

| 4,733,979 | A  | * | 3/1988  | Tsuruki ......................... 384/620 |
| 5,407,041 | A  | * | 4/1995  | Fukunaga et al. ........... 192/3.29 |
| 6,044,946 | A  | * | 4/2000  | Makino et al. .............. 192/41 A |
| 6,782,983 | B2 | * | 8/2004  | Yamamoto et al. .......... 192/3.29 |
| 6,830,136 | B2 | * | 12/2004 | Arhab et al. ................. 192/3.29 |
| 7,762,065 | B2 | * | 7/2010  | Ochi et al. ....................... 60/345 |
| 8,453,439 | B2 | * | 6/2013  | Peri ................................. 60/331 |
| 2008/0185257 | A1 |   | 8/2008  | Ochi et al. |

FOREIGN PATENT DOCUMENTS

| DE | 4330264     | 3/1994 |
| DE | 19852772    | 6/1999 |
| DE | 102005006253 | 8/2006 |
| DE | 102006028771 | 1/2008 |
| DE | 102007053968 | 6/2008 |
| DE | 102009007061 | 8/2009 |
| WO | 0201091     | 1/2002 |

* cited by examiner

*Primary Examiner* — Thomas E Lazo
(74) *Attorney, Agent, or Firm* — Simpson & Simpson, PLLC (57) ABSTRACT

The invention relates to a hydrodynamic torque converter, comprising: a torsion vibration damper and an axial bearing disposed between a damper component of the torsion vibration damper or a turbine shell of the hydrodynamic torque converter, the turbine shell connected with the damper component, and an adjacent connecting component; and devices for centering the axial bearing in a radial direction. The invention is characterized in that the axial bearing is disposed between two disc shaped components and the centering devices are disposed at least at one of the two disc shaped components.

1 Claim, 5 Drawing Sheets

HYDRODYNAMIC TORQUE CONVERTER WITH TORSION VIBRATION DAMPER

CROSS REFERENCE TO RELATED APPLICATIONS

This application is filed under 35 U.S.C. §120 and §365(c) as a continuation of International Patent Application PCT/DE2010/001230 filed Oct. 18, 2010, which application claims priority from German Patent Application No. 10 2009 052 295.6 filed Nov. 9, 2009 and from German Patent Application No. 10 2010 027 255.8 filed Jul. 15, 2010, which applications are incorporated herein by reference.

FIELD OF THE INVENTION

The invention relates to a hydrodynamic torque converter with a torsion vibration damper and an axial bearing disposed between a damper component of the torsion vibration damper or a turbine shell of the hydrodynamic torque converter connected to the torsion vibration damper, and an adjacent connecting component, and the invention also relates to devices for centering the axial bearing in radial direction.

The invention relates in particular to a hydrodynamic torque converter configured for application in automated straight shifting transmissions or automated conventional transmissions.

BACKGROUND OF THE INVENTION

A torque transmission device with a hydrodynamic torque converter of this type with a torsion vibration damper is known e.g. from the printed patent document DE 10 2006 028 771 A1. In this document, the turbine shell of the hydrodynamic torque converter is connected at a damper input component of the torsion vibration damper and at a turbine hub. The damper component acting as a damper output is connected with a damper hub and the damper hub in turn is connected with a transmission input shaft of a subsequent transmission. The attachment of the turbine shell at the torsion vibration damper, in particular the damper input component and/or the turbine hub, is performed through a bud weld, wherein attachment devices are disposed in the turbine shell and complementary thereto at the damper input component, e.g. configured as recesses. For axial support, an axial bearing is provided between the turbine shell and an axially disposed connecting component, in particular a freewheeling clutch of a stator shell. When the turbine shell and the damper input and the turbine hub are arranged for assembly, an alignment of all components including axial bearings relative to one another is required, so that the complementary recesses of turbine shell and damper input are disposed on top of one another, so that a rivet can be inserted through both recesses. The axial bearing is centered in radial direction through a radially oriented support surface at the turbine hub. For this purpose, a radial support surface has to be provided at the turbine hub, which makes fabrication more complex in particular when the turbine hub is configured as aluminum pressure cast component. The illustrated axial bearing assembly and its bearing environment furthermore require large installation space in axial direction, since an additional turbine hub is provided.

In order to reduce the number of components, a torque transmission device without a turbine hub is disclosed in the printed document DE 10 2007 053 968 A1, wherein the torque transmission device includes a hydrodynamic component configured as a hydrodynamic speed-/torque converter, whose output configured as a turbine shell is connected with a damper component of a torsion vibration damper connected subsequent to the turbine shell, in particular connected with a damper input. The axial support between the damper input and the turbine shell is thus implemented by an axial bearing disposed between a damper input and a freewheeling clutch lateral disc of the freewheeling clutch associated with the stator shell of the hydrodynamic component. The axial bearing seat in radial direction is thus formed by a surface portion that is generated at an inner circumference of the damper input through forming and that is aligned in radial direction. The centering diameter for the axial bearing is defined by the sheet metal thickness of the damper input. This has the effect that on the one hand the entire connection geometry, in particular for the freewheeling clutch side disc and the damper hub, has to be adapted to this configuration, and when fabricating the damper input, a potentially required surface treatment has to satisfy this function.

In another embodiment of a hydrodynamic torque converter with a torsion vibration damper centering an axial bearing required between the torsion vibration damper and the turbine shell is performed at an element of the freewheeling clutch itself. Thus, the element of the freewheeling clutch has to be modified with respect to this function, which necessitates special embodiments of these elements, which are very complex and expensive. Such elements of the freewheeling clutch are formed e.g. by freewheeling clutch side discs, which are then configured as pressure cast components.

Furthermore, it is known from the printed document DE 10 2005 006 A1 to center axial bearings in a radial direction at connecting components.

SUMMARY OF THE INVENTION

It is the object of the invention to improve a hydrodynamic torque converter with a torsion vibration damper as recited supra, in particular with a turbine shell directly connected with the damper input, so that the recited disadvantages are avoided and centering the axial bearing is simple from a fabrication point of view, and while maintaining the axial and radial support.

The solution according to the invention is provided through the embodiments characterized by the features of claim 1, which respectively can be used by themselves or in combination with one another.

A hydrodynamic torque converter including a torsion vibration damper and an axial bearing disposed between a damper component of the torsion vibration damper or a turbine shell connected with the damper component of the hydrodynamic torque converter and an adjacent connecting component, and including means for centering the axial bearing in radial direction is characterized according to the invention in that the components directly supported through the axial bearing are configured as disc shaped components, wherein a centering device for centering the axial bearing is configured at least at one of the disc shaped components.

In a particularly advantageous embodiment according to the invention the damper side disc shaped component in this embodiment and in additional embodiments according to the invention is formed by a damper component, in particular a side disc functioning as damper input. The component on the side of the stator shell can be formed by a freewheeling clutch side disc or another component supported at the stator shell.

The solution according to the invention according to the first embodiment avoids complex configurations of the components for supporting and configuring the particular support surfaces of the axial bearing or of connecting components connected subsequent to these component, wherein the connecting components have circumferentially configured and possibly surface treated centering surfaces and facilitate a controlled locally limited arrangement of particular centering devices with the same centering effect. Through the configuration of the components supported through the axial bearing, wherein the components are configured as simple disc shaped components facilitates fabricating them in a cost effective manner with low fabrication complexity. Thus, in a particularly advantageous embodiment the particular disc shaped components are formed by sheet metal components which in the simplest case can be fabricated with centering units as components of the centering devices through cutting and in another embodiment through cutting and forming.

The limited local configuration and arrangement of the centering devices furthermore has the advantage to move the centering around at will between portions of the environment of the axial bearing, in particular in order to use the existing installation space more effectively. Furthermore, there is also the option to use portions between one of the disc shaped components in a controlled manner to arrange the centering devices, wherein these portions are limited with respect to the available free installation space in a circumferential direction. The solution according to the invention thus facilitates overall particularly space saving axial bearing assemblies with only minor required modifications for centering.

In order to provide reliable centering of the components relative to one another over the entire circumference of the components at least two preferably a plurality of centering devices is provided which are disposed offset relative to one another in circumferential direction. The options for arrangement are many and can be categorized with respect to the association with the particular disc shaped components and with respect to their arrangement itself.

In a first embodiment the two or plural centering devices are respectively configured between the same disc shaped component and the axial bearing. This option has the advantage that the other disc shaped component can be produced in a simple and cost effective manner since no modifications for centering devices are required at the disc shaped component. Furthermore the bearing association of the particular centering devices relative to one another is defined unambiguously without additional auxiliary devices.

In a second embodiment the two or plural centering devices are respectively configured between disc shaped components and the axial bearing. This solution is relevant in particular for special installation space requirements.

When one or plural centering devices are provided the two or plural centering devices are preferably disposed evenly distributed in circumferential direction in order to prevent imbalances. This arrangement according to a first sub embodiment can be provided on a common arrangement diameter or according to another sub embodiment on plural arrangement diameters.

The special arrangement of the centering devices can be provided as a function of the configuration of the centering devices within a radial portion of extension which is characterized by the inner circumference of the axial bearing within the radial extension of the axial bearing itself and/or outside of the radial extension of the axial bearing. The particular selection and arrangement is performed as a function of the installation space available and as a function of the centering devices themselves.

With respect to the functional and engineering configuration of the particular centering device there is a plurality of options. Thus, a particular centering device includes a centering unit configured at the disc shaped component and a centering unit configured at the axial bearing in a complementary manner which significantly shortens the direct centering between the disc shaped component and the axial bearing and the tolerance chain associated therewith.

The configuration of the particular centering units can be performed in very different variants which can be used by themselves or in combination with one another in a centering device or in different centering devices.

In a first variant the centering unit configured at the disc shaped component includes a radial support surface extending over a partial portion of the disc shaped component in circumferential direction and the centering unit configured at the axial bearing includes a radial surface at the axial bearing wherein the radial surface is oriented towards the support surface. Alternatively or in combination with this variant the centering unit configured at the disc shaped component includes a support surface oriented in circumferential direction at the disc shaped component and the centering unit configured at the axial bearing includes a surface at the axial bearing oriented towards the surface in circumferential direction. The support can be provided through form- and/or friction locking between the support surface at the disc shaped component and the surface at the axial bearing in radial and circumferential direction which interacts with the support surface at the disc shaped component.

Depending on the configuration the friction and/or form locking in the respective direction can be performed on one side or on both sides.

In an advantageous embodiment of the first variant the particular centering units are configured, so that a support surface or a surface is formed by a surface portion which exists anyhow at the disc shaped component or at the axial bearing, in particular an axial bearing ring. In this case no modifications are required or only minor modifications are required at the other element, axial bearing or disc shaped component, which helps to minimize manufacturing complexity and which facilitates the use of standardized elements for the disc shaped component or the axial bearing. An embodiment of this type includes a configuration of the particular support surface at the disc shaped component at an axial rise/protrusion and includes a configuration of the surface of a axial bearing ring surface or bearing housing surface which is provided at the axial bearing anyhow interacting with the particular support surface.

In a second embodiment the centering unit configured at the disc shaped component includes a rise integrally configured with the component or formed as an element separately attached to the component and the centering unit configured at the axial bearing includes a recess. According to a third variant which is an alternative to the second variant the centering unit configured at the axial bearing is configured as a protrusion which is integrally configured or configured as an element separately attached to the axial bearing and the centering unit configured at the disc shaped component is configured as a recess. Through the centering units a precisely fitting association can be performed in both embodiments in particular through form locking.

In all recited variants the centering unit formed at the disc shaped component or at the axial bearing can be formed by an axial material deflection. The axial material protrusion is a local displacement of material starting at a side of the respective component which extends at the other side in axial direction as an at least locally defined protrusion.

For the actual configuration of the particular material protrusions there is a plurality of possibilities. They can be formed by cutting methods, forming methods, a combination of cutting and forming methods.

In a first option the particular material protrusion is formed as an ear at the disc shaped component. Thus, the configuration of the ear is performed through hinged fold out of material from the respective component. Thus, the ear shape is cut into the component and pressed out from the component while remaining connected to the component. The embodiment of the particular ear can be configured as a function of the deformation direction of the ear relative to the connection axis with the component, so that the pressed out portions are either formed by the separation surface formed through the separation or by the pressed out face surface portion of the disc shaped component. Ears of this type are used in particular for forming radial support surfaces.

Another advantageous embodiment includes configuring the particular material protrusion as a pass through. This is achieved by applying pressure creating plastic deformation at the opposite face side of the disc shaped component or a radially extended portion of an axial bearing ring or an axial bearing housing portion. Thus, only material is combined from a portion in the axially generated protrusion.

With respect to the geometric shape and-or dimensions of the particular material protrusions there are various possible configurations. These depend in particular on the type, shape size and operating parameters of the particular tool generating the material protrusion, wherein preferably geometries are selected which are configured according to the desired function to be performed at the functional surface to be formed. The pass through can be formed e.g. as a pinion or annular segment.

The material deflections are thus suitable for configuring radial support surfaces at the disc shaped component or radial surfaces at the axial bearing, wherein the surfaces interact with respective surfaces at the axial bearing or support surfaces at the disc shaped component and the material protrusions are also configured for forming support surfaces or surfaces in circumferential direction.

According to an advantageous embodiment, however, it is also conceivable for the material protrusions to form connection- or attachment elements in a functional concentration, in particular form locking connection devices.

As separate elements for forming the axial rises/protrusions elements are being used which are connected with a disc shaped component or the axial bearing, in particular axial bearing ring or bearing housing. Thus, in particular standard elements like pinions, pins, rivets, bolts and screws are being used.

The recesses can be configured as pass through openings or blind openings; this means recesses that are open on one side. They can be configured in any different shape as a function of the protrusions with respect to their geometric shapes and/or dimensions. Preferably slotted holes, pass through bore holes, rivets are conceivable.

According to an advantageous embodiment the particular centering device is configured functionally concentrated as a torque proof connection which facilitates a fixed association of a disc shaped component and axial bearing in all directions. These include connection or attachment devices which in a first embodiment are integrally connected with the particular disc shaped component or the axial bearing, in particular an axial support ring or bearing housing component or which are in a second embodiment connected with this component as separate components.

In a particularly advantageous embodiment of this configuration the connection which is provided anyhow between the damper component, in particular the damper input component and turbine shell, in particular turbine shell disc is used for configuring the centering devices. Thus, the axial support ring between the damper component and the turbine shell disc is configured extended in radial direction into the connection portion, wherein the radial extension exists in particular along the face of the disc shaped component, in particular the damper component. In this case no additional modifications are required at the supporting disc shaped components. This assembly can also be retrofitted in existing configurations.

In a solution according to the invention according to a second embodiment the hydrodynamic torque converter is provided with a torsion vibration damper and an axial bearing provided between a damper component of the torsion vibration damper or a turbine shell of the torsion vibration damper connected with the torsion vibration damper and an adjacent connecting component and with devices for centering the axial bearing in a radial direction, wherein the components directly supported through the axial bearing are configured as disc shaped components, wherein at least one of the disc shaped components and the axial bearing are configured, so that the axial bearing is engaged at the disc shaped component or at an intermediary space between the disc shaped component and a connecting element, in particular a hub of the hydrodynamic torque converter.

The engagement is preferably performed at radial support surfaces at the disc shaped component through interaction with radial surfaces at the axial bearing. Thus the radial support surfaces can be configured as circumferential support surfaces or support surface segments extending in a circumferential direction. This also applies analogously for the particular surfaces at the axial bearing.

In a first variant of the second embodiment according to the invention the radial support surface is formed at surfaces that are provided anyhow at the disc shaped component, in particular when the disc shaped component is configured as a damper component at the radial surface configured at the inner circumference of the disc shaped component. The axial bearing can be engaged at an inner circumference of the damper component through configuring a respective radial extension at the diameter of the inner circumference of the damper component and a respective axial protrusion which configures radial support surfaces.

A second variant is characterized in that it forms centering units configured as axial protrusions at the axial bearing which are engageable in axial direction in centering units configured as recesses at the disc shaped component. The centering unit thus formed at the disc shaped component forms a radial support surface extending over a partial portion of the disc shaped component in circumferential direction and the centering unit configured at the axial bearing forms a radial surface at the axial bearing oriented towards the radial support surface. Alternatively or in combination with this variant the centering unit configured at the disc shaped component includes a circumferential surface oriented in a circumferential direction at the axial bearing and the centering unit configured at the axial bearing forms a surface at the axial bearing, wherein the surface is oriented towards the circumferential surface. The support can be provided through form locking and/or friction locking between the support surface at the disc shaped component and the surface in radial and/or circumferential interacting with the support surface.

Depending on the configuration, the form and/or friction locking in the respective direction can be provided only on one side or on both sides.

A third variant of the second embodiment according to the invention is characterized in that the engagement is performed at an offset plane provided at the disc shaped component. This is assured through the respective shaping of the disc shaped component while configuring a radial support surface configured in the portion of the radial extension and through the complementary configuration of the subsequent axial support ring forming radial surfaces which interact with the support surfaces at the disc shaped component.

In a solution according to the invention according to a third embodiment the hydrodynamic torque converter is provided with a torsion vibration damper and an axial bearing disposed between a damper component of the torsion vibration damper or a turbine shell of the hydrodynamic torque converter connected with the torsion vibration damper and an adjacent connecting component and provided with devices for centering the axial bearing in radial direction, wherein the components directly supported by the axial bearing are configured as disc shaped components and the axial bearing is centered at a connecting element in the bearing environment or directly through an additional centering element.

The centering can be performed at a hub, at a component connected torque proof with the disc shaped component, in particular the turbine shell or the turbine shell disc. Furthermore the centering function can be provided through a simple additional centering element forming radial support surfaces. In this case there is the option to provide the particular components which are part of the axial bearing, in particular the axial bearing itself and the disc shaped components in a particularly simple and compact manner and to only adapt the centering function through additional elements to the actual engineering requirements.

In an advantageous embodiment devices for axial safety including at least one axial safety element are provided for axial securing between an axial bearing or the additional centering element and a connection element in the bearing environment, in particular in the turbine shell disc or the damper component or the hub.

The solution according to the invention is suitable in particular for centering an axial bearing, in particular for supporting the axial bearing between a damper component, in particular a damper input component and/or a component connected torque proof there with and a bladed shell of a hydrodynamic component or an element connected torque proof there with. According to a first variant the disposition between damper component, in particular damper input and stator shell can be provided according to another variant between turbine shell and a stator shell of a hydrodynamic component.

The solution according to the invention is configured in particular for centering the axial bearing at a damper component which is not directly supported at the hub.

BRIEF DESCRIPTION OF THE SEVERAL VIEWS OF THE DRAWINGS

The solution according to the invention is subsequently described in detail with reference to drawing figures wherein.

DETAILED DESCRIPTION OF EMBODIMENTS OF THE INVENTION

Figure 1:
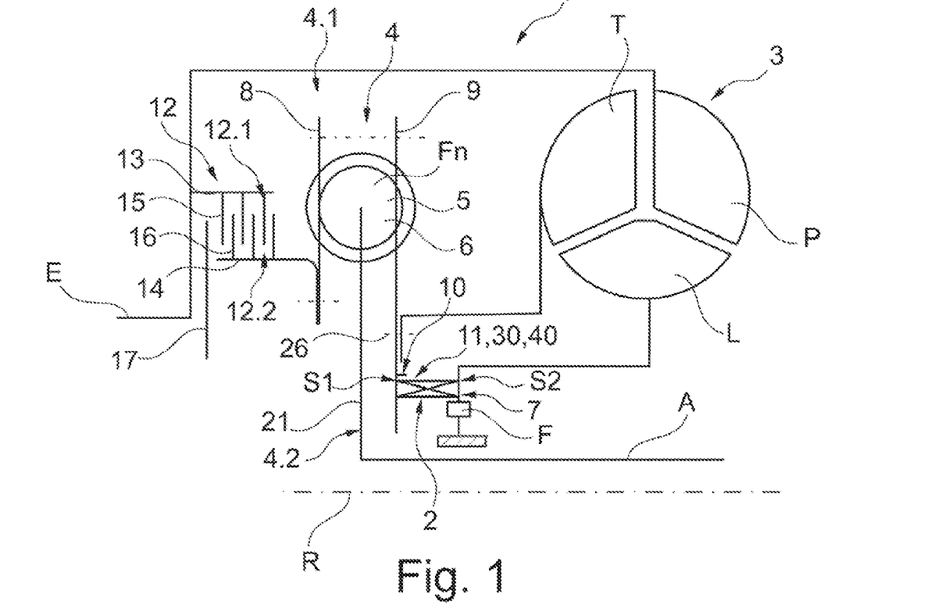
FIG. 1 illustrates an embodiment of a configuration of a torque transmission device with a centering of an axial bearing provided according to the invention in a simplified schematic view.

FIG. 1 illustrates an arrangement and a configuration of a centering configured according to the invention for an axial bearing 2 at a damper input component in a highly simplified schematic illustration with reference to an embodiment of a torque transmission device 1. The torque transmission device 1 includes at least one input E and at least one output A which is connectable torque proof e.g. with a transmission input shaft of a subsequent transmission unit. The input E is connected at least indirectly with a drive unit which is not illustrated herein, this means connected directly or through additional transmission elements. The torque transmission device 1 includes at least one hydrodynamic component and a vibration damping device subsequently also abbreviated as torsion vibration damper 4. The hydrodynamic component can be configured in various manners. It can be a hydrodynamic clutch or in a particularly preferred embodiment as illustrated in FIG. 1 it can be a hydrodynamic torque converter 3. The hydrodynamic torque converter 3 is disposed in the force flow between the input E and the output A. The hydrodynamic torque converter in the illustrated embodiment is disposed in the force flow behind the torsion vibration damper 4. Thus, the hydrodynamic torque converter 3 includes a bladed shell at least connected indirectly torque proof with the input E of the torque transmission device 1 and functioning as a pump shell P in force flow direction from the input E to the output A and a turbine shell T connected at least indirectly torque proof with the output A. The pump shell P and the turbine shell T thus form an operating cavity which can be filled with an operating agent. When configured as a hydrodynamic torque converter, at least one stator shell L is additionally provided as a reactive link. The hydrodynamic torque converter thus is simultaneously used for converting speed and torque.

The torsion vibration damper 4 is connected in the force flow behind the hydrodynamic torque converter 3. Thus, the turbine shell T is connected torque proof with the torsion vibration damper 4. The torsion vibration damper 4 includes a one component- or multi component first damper component which is also designated as damper input component and another one or multi component second damper component which is connected with the output A at least indirectly torque proof. Both damper components 4.1 and 4.2 are disposed coaxial relative to one another and rotatable in circumferential direction within limits. The coupling of the damper components 4.1 and 4.2 can thus be performed directly through torque transmission devices 5 and/or damping coupling devices 6 which are preferably formed with the same functional components configured as spring units Fn which are configured as singular springs or as spring packets and which are supported with their end portions alternatively at the damper components 4.1 and 4.2. Besides the configuration as a simple damper, there is the option to configure the torsion vibration damper 4 as a multi stage damper assembly. The damper component 4.1 and the damper component 4.2 in this case are coupled with one another through at least two damper stages which can be connected in series and/or in parallel. In this case additional intermediary flanges are provided which form the respective damper stages with the damper components 4.1 or 4.2 or with additional intermediary flanges. Supporting the hydrodynamic torque converter 3, in particular the turbine shell T or an element connected torque proof there with in particular a damper component 4.1 is performed at an axial connecting component 7. This can be e.g. the stator shell L or a freewheeling clutch F provided between the stator shell L and the respective support of the stator shell L. Thus, it is required to center the axial bearing 2 with respect to its position in radial direction relative to the torsion vibration damper 4 and the hydrodynamic torque converter 3. According to the invention the components directly supported through the axial bearing 2 are configured as disc shaped components S1, S2 and devices 10 are provided for centering the axial bearing 2. Depending on the embodiment these devices can be configured as centering devices 11, engagement 34 or separate centering elements 43 as described subsequently. Thus, the centering is used for radially supporting the axial bearing 2 relative to the connection components. The axial bearing 2, itself can be provided in different configurations. The axial bearing can be a rolling bearing or a straight bearing. Thus the arrangement between two disc shaped components S1, S2 disposed in axial direction with respect to the rotation axis R at connecting surfaces oriented towards one another in an axial direction.

In the illustrated embodiment the connection of the turbine shell T with the damper component 4.1 which is made herein of two axially offset lateral discs 8 and 9 is performed at the lateral disc 9. Thus, the connection of the turbine shell T can be performed directly at the lateral disc 9. The axial forces impacting the lateral disc 9 are supported through the axial bearing 2 at a connecting component, thus e.g. at the stator shell L or a component of the freewheeling clutch F.

The torque transmission device according to FIG. 1 furthermore includes e.g. an actuatable clutch device 12, including a first clutch component 12.1 which is connected with the input E at least indirectly torque proof and a second clutch component 12.2 which is connected to the torsion vibration damper 4. The actuatable clutch device 12 is thus used for partially circumventing the force flow through the hydrodynamic component 3. Preferably the actuatable clutch is used for completely bridging the hydrodynamic torque converter 3. The actuatable clutch 12 is configured as a disc clutch preferably provided in multi disc construction. Thus, the clutch includes a disc support 13 and 14 for each clutch component 12.1 and 12.2, wherein elements having friction surfaces and/or forming friction surfaces are disposed torque proof moveable in axial direction which elements can be brought into operative engagement with one another through an actuation device 17. The torque proof connection between the clutch component 12.1 and the input E can be provided through respective connecting elements or an integral configuration of the input E with the disc support 13. Also the disc support 14 which is configured here in an exemplary manner as an inner disc support is connected torque proof with the torsion vibration damper 4, thus the lateral disc 8 of the damper component 4.1.

In order to simplify the centering of the axial bearing 2 the axial bearing 2 is supported at two disc shaped components S1 and S2, wherein devices for radial support are provided at least at a disc shaped component S1. The disc shaped component S1 is formed in a particularly advantageous embodiment directly by the damper component 4.1 in particular the lateral disc 9. Thus, a complex configuration of the radial support devices and thus centering for the axial bearing 2 at a turbine hub and the turbine hub itself can be omitted. The alignment and centering can be performed at simply configured disc shaped elements.

The subsequent figures illustrate particularly advantageous embodiments of axial centering configured according to the invention for positional fixation of the axial bearing 2 between two components S1 and S2 configured disc shaped in the form of a lateral disc 9 of the damper component 4.1 and an axial ring 18 configured as a freewheeling disc at the freewheeling clutch F of the stator shell L with reference to a detail from the bearing environment of the axial bearing 2 in a torque transmission device 1. Thus, the side disc 9 is configured as a disc shaped component S1 and the axial ring 18 is configured as a disc shaped component S2. Other embodiments of the connecting components 7, in particular of the disc shaped component S2 are conceivable. Thus, all subsequent figures represent the same installation condition. Therefore like reference numerals are being used for like elements. As evident in all figures the damper component 4.2 of the torsion vibration damper 4 which is also designated as damper output component, is coupled with an output A or forms the output A. In the illustrated case the damper component 4.2 is configured as an output flange 21 forming a center disc, wherein the output flange is connected torque proof through a respective torque proof connection 22, thus configured as a welded connection, with a damper hub 23 which forms the output A of the torque transmission device 1. Furthermore, the first damper component 4.1, in particular the lateral disc 9 is axially supported at the damper hub 23. Between the damper component 4.1 and the damper hub 20 there is otherwise no torque proof connection. The axial support is performed at a contact surface 24 which is configured oriented in axial direction at the face 23.2 oriented towards the hydrodynamic torque converter 3. A turbine disc 25 is connected torque proof with the damper component 4.1, wherein the turbine disc is either connected torque proof with the turbine shell T or forms an integral unit. The torque proof connection is designated as 26. The axial bearing 2 is thus disposed directly between the damper component 4.1 and an axial ring 18 supported at an outer ring 19 of the freewheeling clutch F. The arrangement is performed between two disc shaped components S1 and S2, wherein the first disc shaped component S1 is formed by the damper component 4.1, in particular the lateral disc 9 and the second disc shaped component S2 is formed by the axial ring 18.

In the illustrated case the axial bearing 2 includes an axial support ring AR1 in an exemplary manner, wherein the axial support ring is supported in axial direction at the disc shaped component S1, in particular the lateral disc 9, and an axial support ring AR2 which is supported at the axial ring 18. Rolling elements ARW are disposed there between.

The FIGS. 2 through 8 illustrate possible configurations according to the first embodiment according to the invention, partially in combination with additional embodiments. Thus, FIGS. 2 through 5 illustrate the configuration of the centering devices 10 according to a first embodiment according to the invention based on a possible bearing situation for the arrangement of the axial bearing 2 between the damper component 4.1 of the torsion vibration damper 4, in particular of the side disc 9 forming the damper input and a connecting component 7 provided in axial direction. At least one of the disc shaped components S1 or S2, herein S1 and the axial bearing 2 are configured in this first embodiment, so that they form centering devices 11 at least at one location within the radial extension of the disc shaped component S1. The particular centering devices 11 include a centering unit 11.1 configured at a disc shaped component and a centering unit configured complementary thereto at the axial bearing 2, which can be brought into operative engagement with one another. In FIGS. 2 through 5, the centering units 11.1 are formed at the disc components S1 by axial material protrusions 20 which extend over a partial portion in circumferential direction. Thus, the particular centering unit 11.1 configured as material deflections 20 in FIGS. 2 through 4 forms a radial support surface for the axial bearing 2, in particular for supporting a radial surface 28 at the axial bearing 2. Thus, preferably at least two centering devices 11 of this type or other centering devices are provided offset in circumferential direction. They can be characterized by the same distance or by different distances from one another. The extension in circumferential direction can thus be selected as a function of the requirements of the application. In the illustrated case, the particular material protrusion 20 is configured as an ear 29 at the disc shaped component S1. The ear 29 is arranged and configured, so that it forms a support surface 27 oriented outward in radial direction. The ear 29 is disposed radially within the axial bearing 2, in particular its inner circumference. Ears 29 of this type in the simplest case are material protrusions in axial direction cut out of the material of the disc element S1, and generated through forming. Thus, the material protrusions are configured at the face 9.2 of the side disc 9 oriented towards the axial bearing.

Figure 2:
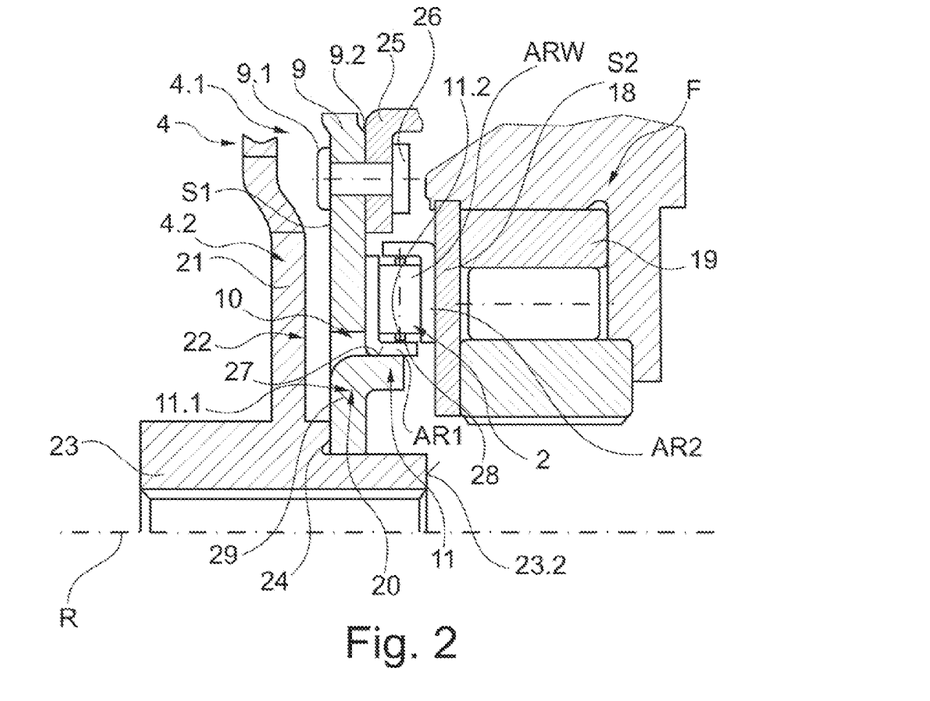
FIG. 2 illustrates a first variant of a first embodiment according to the invention of the centering devices in a detail of an axial sectional view of a torque transmission device.

FIG. 2 illustrates an embodiment in which the ear 29 is formed by a material deflection drawn out at a right angle relative to the face 9.2 of the side disc 9. The radial support surface 27 of the ear 29 is thus formed by the partial portion pressed out of the face 9.1.

Figure 3:
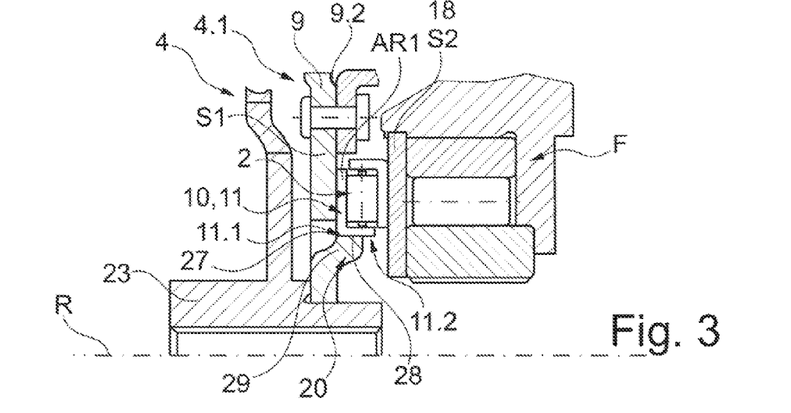
FIG. 3 illustrates another variant of a first embodiment of centering devices according to the invention with reference to a detail from an axial sectional view of a torque transmission device.

Thus, FIG. 3 illustrates an alternative embodiment of the particular material draw-out 20 configured as an ear 29, which differs from the embodiment illustrated in FIG. 2 with respect to its shape and with respect to the configuration of the radial support surface 27. The support surface 27 is formed by the separation surface formed by cutting the ear shape out of the surrounding material at the ear. The surface 28 at the axial bearing 2 supported at the support surface 27 is formed in both cases in an exemplary manner by a surface that is provided anyhow at the axial bearing race AR1 or a bearing housing.

Figure 4:
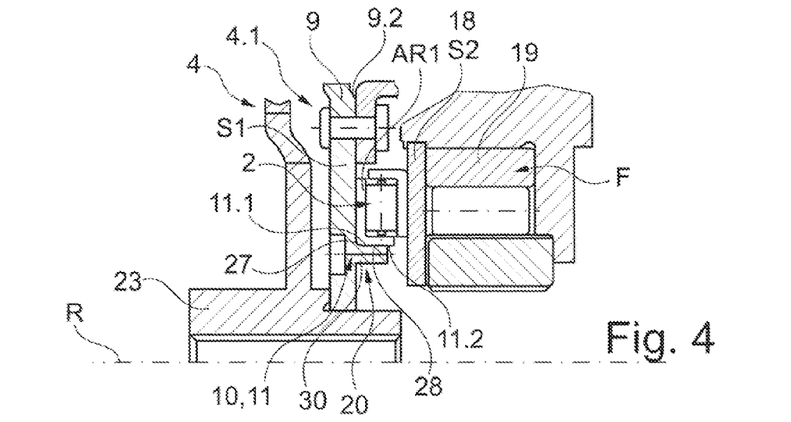
FIG. 4 illustrates another variant of a first embodiment of centering devices according to the invention with reference to a detail of an axial sectional view of a torque transmission device.

FIGS. 2 and 3 illustrate embodiments in which the material draw-outs 20 are fabricated at the disc shaped components S1, configured as a side disc 9 of the damper component 4.1 through cutting and forming. FIG. 4 illustrates an advantageous integral embodiment characterized by material draw-outs 20 configured as pass-through openings 30 from which axial protrusions arise. The formation of these pass-through openings is provided by pressing out material, e.g. configured as cylindrical pinions or other geometries, viewed in axial direction of the component. The centering unit 11.1 thus comprises the particular material draw-outs 20 which form the radial support surface for the surface 28 of the axial bearing 2 forming the centering unit 11.2 with portions of the outer circumferential surfaces of the particular material draw-outs 20.

In the embodiments illustrated in FIGS. 2 through 4, the centering is performed in radial direction, and thus the arrangement of the centering devices 11 in the portion of the inner circumference of the axial bearing 2. In all embodiments, the centering unit 11.2 is formed at the axial bearing by an inner circumferential surface of the axial bearing 2. The inner circumferential surface is preferably a radially oriented surface at the axial bearing ring AR1. It is appreciated that the particular material draw-outs 20 can also be disposed outside of the outer circumference of the axial bearing 2 and then form support surface portions oriented inward in radial direction.

Figure 5:
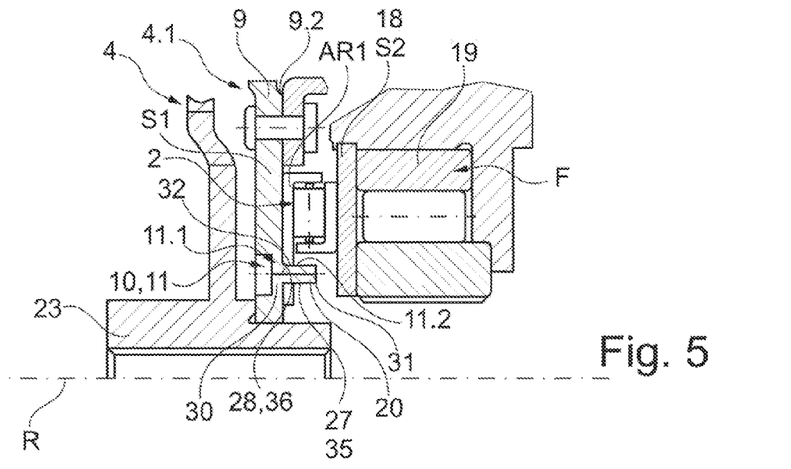
FIG. 5 illustrates another variant of a first embodiment of centering devices according to the invention with reference to a detail of an axial sectional view of a torque transmission device.

FIG. 5 illustrates an improvement over the embodiment according to FIG. 4 in which the support is also provided through axial material draw-outs 20 which are used here in order to engage the axial bearing 2, in particular the axial bearing ring AR1 at the material draw-outs by providing form locking Thus, the centering units 11.1, in particular material draw-outs 20 are preferably also configured here in the form of pass-through openings 30 forming axial protrusions or rises, wherein the pass-through openings configure form locking elements 31, acting in radial direction and in circumferential direction, wherein the form locking elements interact with the centering unit 11.2 at the axial bearing 2. The centering unit 11.2 at the axial bearing 2 includes pass-through openings forming recesses 32, wherein the pass-through openings receive the material draw-outs 20 of the centering unit 11.1 configuring form locking at least in a radial direction, preferably also in a circumferential direction. The axial bearing 2 is engaged at the disc shaped component S1 at the form locking elements 31. The particular radial form locking element 31 forms at least one, preferably two, radial support surfaces 27 with its outer circumference, which interact with radial surfaces 28 at the recess 32. Furthermore, the centering units 11.1 form support surfaces 35 oriented towards the recesses 32 in a circumferential direction for a precisely fitting configuration of the form locking elements, wherein the support surfaces interact in circumferential direction with the surfaces 36 formed at the recesses 32 of the centering unit 11.2.

Thus, in a particularly preferred embodiment, the axial bearing race AR1 is configured extended in radial direction, thus into the radial portion within the inner circumference of the axial bearing 2, wherein the recess 32 configured as a pass-through opening is disposed in the portion of this extension. The extension and thus the arrangement of the particular centering device 11 can also be performed in a radial direction in a portion outside of the axial bearing 2.

The form locking elements 31 can have many configurations. In a particularly advantageous embodiment, they form axially oriented pinions or segments. Thus, any cross section geometry of the axial material draw-outs 20 is conceivable.

All embodiments illustrated in FIGS. 2 through 5 preferably require at least two material draw-outs of this type, which are disposed offset from one another, in order to assure sufficient centering. Preferably, the material draw-outs are disposed in a circumferential direction on a common arrangement diameter and disposed opposite to one another. However, also plural centering devices 11 distributed over the circumference are feasible, wherein the arrangement of the centering devices can be performed also on different diameters.

Figures 6A, 6B, 6C, 7:
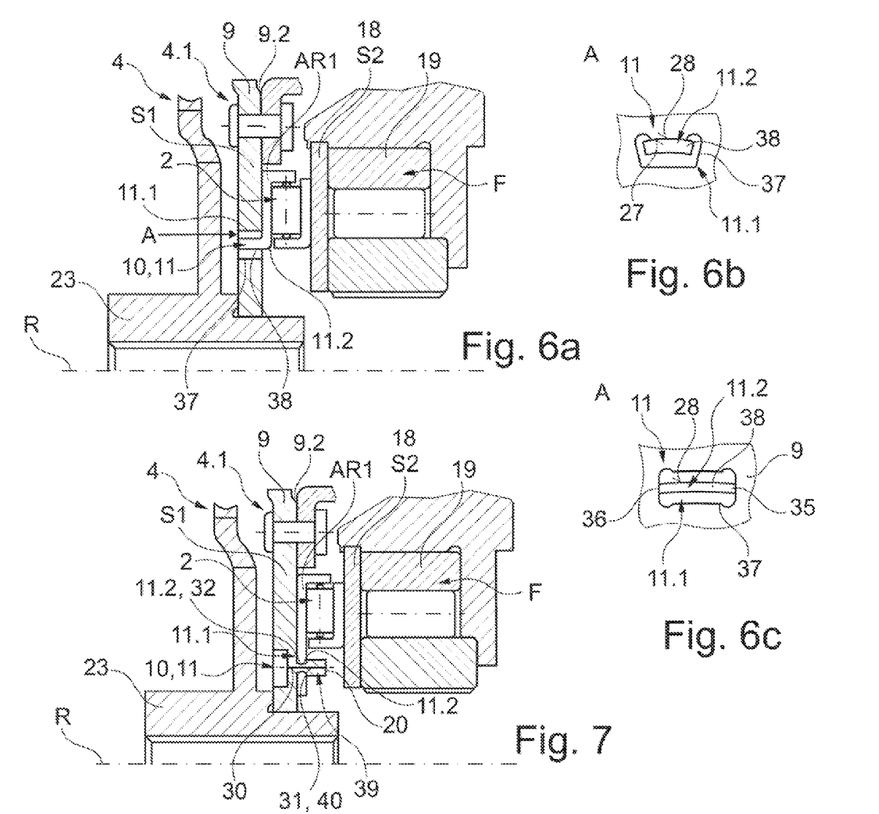
FIG. 6a illustrates another variant of a first embodiment of centering devices according to the invention with reference to a detail of an axial sectional view of a torque transmission device.
FIGS. 6b and 6c illustrate optional configurations of the variant according to FIG. 6a in a view A.
FIG. 7 illustrates another variant of a first embodiment of centering devices according to the invention with reference to a detail of an axial sectional view of a torque transmission device.

FIG. 6a illustrates a possible alternative to FIG. 5, including a configuration of the centering unit 11.1 at the disc shaped component S1 configured as a recess 37, in particular a pass-through opening and of the centering unit 11.2 at the axial bearing 2 configured as an axial rise 38. The axial rise is configured at the axial bearing race AR1 supported at the disc shaped component S1 and engages the recess 37, which provides an engagement of the axial bearing race AR1 at the disc shaped component S1. Thus, as a function of the formation of the axial rises 38, which are preferably configured in the portion of the inner- or outer circumference of the axial bearing race 1 and of the associated recess 37, force- or form locking can be provided in radial and/or axial direction.

The axial bearing race AR1 is configured Z-shaped in cross section in an exemplary manner, wherein the radially inward oriented arm forms the rise 38 engaging the disc shaped component S1. FIGS. 6b and 6c thus illustrate different centering options in an exemplary manner. FIG. 6b illustrates the centering unit 11.1 with the recess 37 for an embodiment according to FIG. 6a in a view A of the lateral disc 9, wherein the axial rise 38 of the centering unit 11.2 is illustrated in an engaging manner in the recess 37. Thus, the engagement in FIG. 6b is provided forming form locking in radial direction. The recess 37 forms radial support surfaces 27, the axial rise 38 forms radial surfaces 28 at the axial bearing 2, in particular at the axial bearing race AR1.

On the other hand, FIG. 6c illustrates an embodiment with flank centered engagement of the axial rise 38 in the recess 37. Thus, form locking or friction locking in circumferential direction is achieved through support surfaces 35 formed in the recess 37 of the centering unit 11.1 through the circumferentially oriented surfaces 36 of the centering unit 11.2 configured as an axial rises 38. The statements recited supra also apply to this embodiment with respect to the arrangement and the selected number of the particular centering devices 11.

Figure 8:
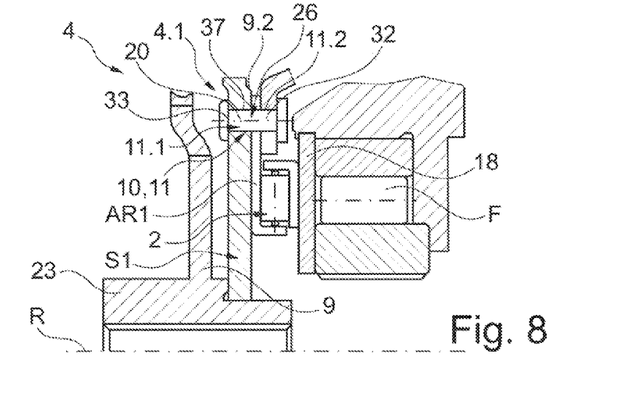
FIG. 8 illustrates another variant of a first embodiment of centering devices according to the invention with reference to a detail of an axial sectional view of a torque transmission device.

FIGS. 7 and 8 illustrate further variants of the configuration of the centering devices 11 according to the first embodiment according to the invention. They simultaneously form torque proof connections 39 between a disc shaped component, thus S1, and the axial bearing 2, in particular the axial bearing race AR1. Thus, the axial rises can be formed at one of the components, the disc shaped component S1 or the axial bearing 2 through integral or separate mounting elements which form the connection 39 with the centering unit at the other component.

FIG. 7 illustrates an embodiment of the centering units 11.1 and 11.2 forming a connection 39, in particular a non-disengageable connection by riveting together with integral configuration of the attachment elements at the disc shaped component S1 configured as an axial material draw-out 20. The axial material draw-out 20 simultaneously forms a rivet element 40 in the form of a pass-through rivet which is configured passing through the recess 32 at the axial bearing 2, in particular the axial bearing race AR1, wherein the recess is configured as a pass-through opening, and connected through form locking with the axial bearing race.

Thus, FIG. 7 illustrates a particularly advantageous embodiment with high functional concentration.

An embodiment of the centering unit 11.1 with separate attachment elements, which, however, is not illustrated in FIG. 7, is also conceivable, wherein the attachment elements are supported in recesses or pass-through openings and are used for connecting with the axial bearing 2 and configured e.g. as bolts, screws or similar.

All recited variants of centering devices 11 configured according to the invention can also be provided at the axial ring 18. Furthermore, all recited configurations can also be provided and disposed outside of the axial bearing 2, viewed in axial direction.

FIG. 8 illustrates an advantageous embodiment of the centering devices 11 forming a connection 39, wherein connections in the bearing environment are being used, which exist anyhow. In the illustrated case, a torque proof connection between damper component 4.1, in particular side disc 9, and turbine shell T is used for forming the centering devices 11. The centering unit 11.1 at the disc shaped component S1 includes a recess 37 configured as pass-through opening and mounting or connecting elements 33 configured as rivet bolts and connected with the disc shaped component, wherein the rivet bolts are supported by recesses 32 at the axial bearing 2, in particular the axial bearing race AR1. In this case, the axial bearing race AR1 is disposed between the disc shaped component S1 and the turbine shell T, or an element connected torque proof therewith, in particular the turbine shell disc 25 and attached at these components. The centering is performed directly in the joint between the torsion vibration damper 4 and the turbine shell T.

Figure 9:
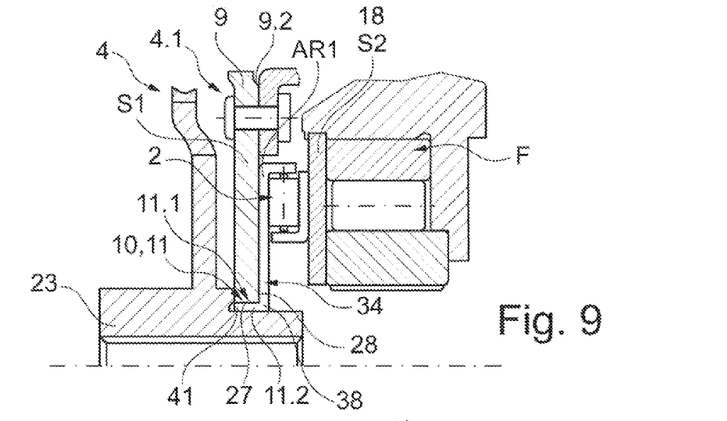
FIG. 9 illustrates a first variant of a second embodiment of centering devices according to the invention with reference to a detail of an axial sectional view of a torque transmission device.
Figure 10:
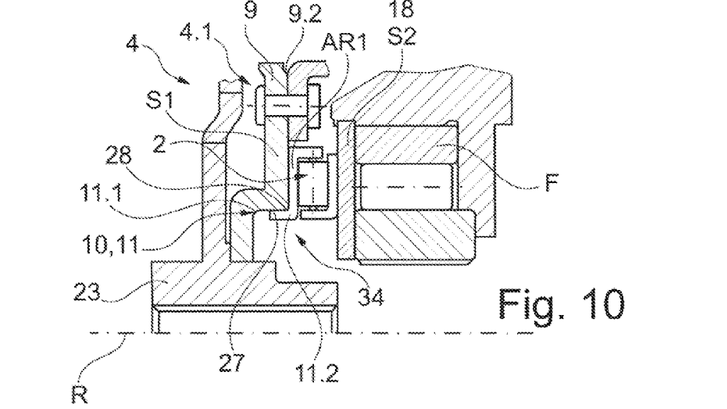
FIG. 10 illustrates a second variant of a second embodiment of centering devices according to the invention with reference to a detail of an axial sectional view of a torque transmission device.
Figure 11:
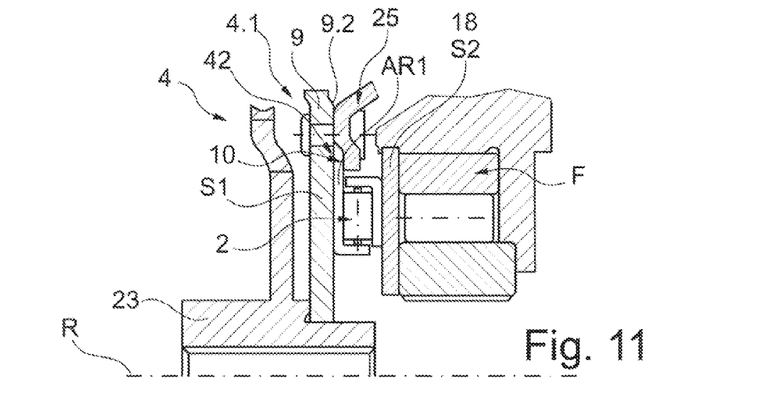
FIG. 11 illustrates a first variant of a third embodiment of centering devices according to the invention with reference to a detail of an axial sectional view of a torque transmission device.

FIG. 9 through 11 illustrate possible variants of the centering according to a second embodiment according to the invention through engagement. The devices 10 include devices 34 for engaging the axial bearing 2 in at least one of the adjacent disc shaped components S1 and/or S2. They include radial support surfaces 27 at one of the disc shaped components S1 or S2 configured circumferential at least in circumferential direction, or several of them disposed offset in circumferential direction, and complementary radial surfaces 28 or a circumferential surface 28 at the axial bearing 2 interacting with disc shaped components S1 or S2. Thus, a rise extending in axial direction is provided at the axial bearing 2, in particular a protrusion 38 which forms the radially oriented surface or surfaces 28.

FIG. 9 illustrates a first particularly advantageous embodiment which does not require any modification at the disc shaped component S1. The axial bearing race AR1 is formed, so that it is configured extending in radial direction in the direction of the inner circumference of the disc shaped component S1, wherein the axial protrusion 38 is configured so that it engages the intermediary space 41 formed between the damper hub 23 and the inner circumference of the damper component 4.1. The axial bearing race AR1 thus comprises an axial protrusion or plural axial protrusions 38, which form a surface 28 oriented in radial direction, wherein the protrusions interact with the inner circumference of the lateral disc 9 and the support surface 27 formed by the lateral disc 9. For this embodiment, the axial protrusion 38 can be configured annular and closed in circumferential direction, forming a surface 28 which is circumferential in circumferential direction. In this embodiment, the entire axial bearing ring AR1 is configured Z-shaped, viewed in cross sectional direction. It is also conceivable to only dispose particular axial protrusions 38 in circumferential direction, wherein the protrusions are disposed offset relative to one another.

The variant according to FIG. 9 according to the second embodiment is characterized in that substantially no modification is performed at the disc shaped component S1, the configuration according to FIG. 10 is characterized by a respective shape of the disc shaped component S1 which is configured as a lateral disc 9 and characterized by the axial bearing race AR1. Both are configured herein, so that they form radial support surfaces 27 oriented towards one another and surfaces 28 which are aligned opposite to one another. Thus also here engaging the axial bearing 2 is performed radially within or outside of the axial bearing 2 in an offset plane at the connecting component, in particular the disc shaped component S1. The disc shaped component S1 thus forms an axially deformed portion which forms a support surface 27 oriented in a radial direction relative to the rotation axis R, wherein the support surface 27 can be brought into operative engagement with a complementary support surface 28 at the axial bearing ring AR1 in order to perform the centering. Thus, the engagement in circumferential direction can be performed closed or segmented, this means the two support surfaces 27 and 28 which can be brought into operative engagement with one another are configured circumferential with one another or at least one of the surfaces is configured as a closed surface in circumferential direction or it is formed by a plurality of partial surfaces which are configured offset from one another.

Figure 12:
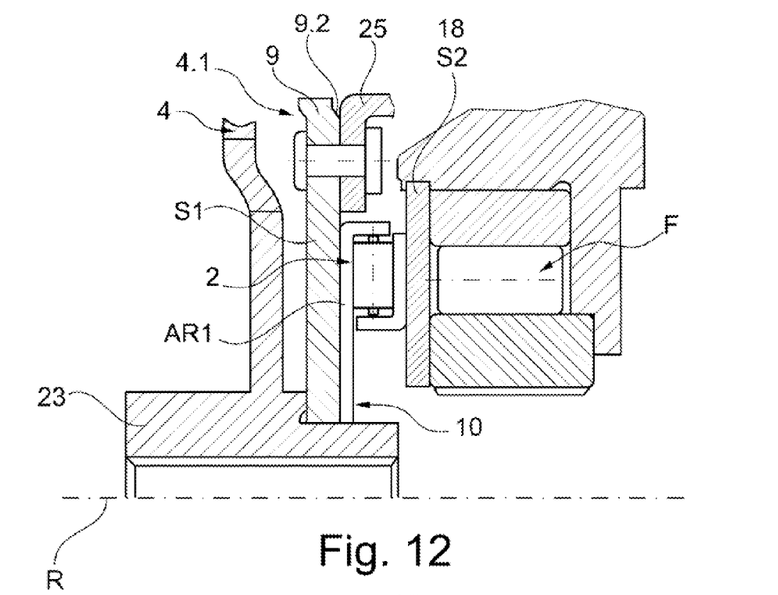
FIG. 12 illustrates an another variant of a third embodiment of centering devices according to the invention with reference to a detail of an axial sectional view of a torque transmission device; and, FIG. 13 illustrates an another variant of a third embodiment of centering devices according to the invention with reference to a detail of an axial sectional view of a torque transmission device.
Figure 13:
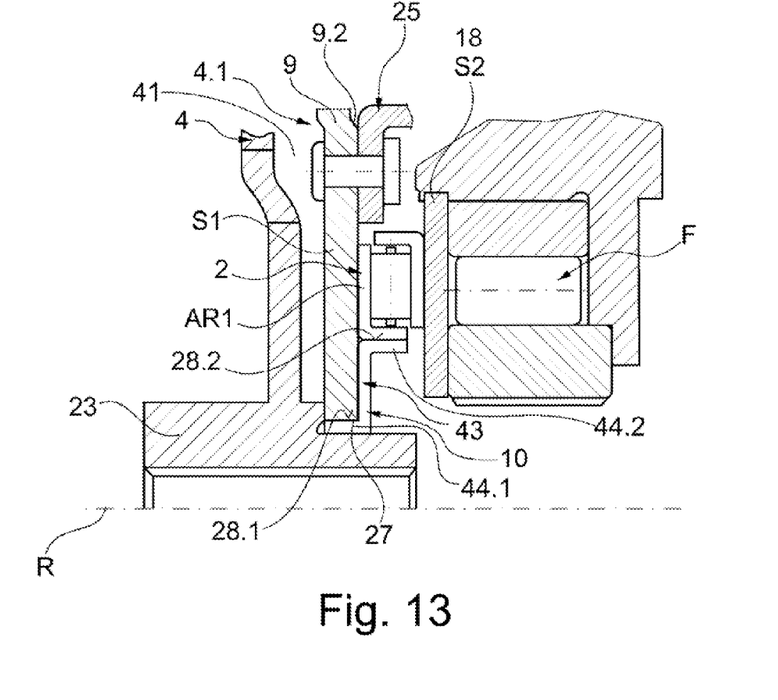

FIGS. 11 through 13 illustrate variants of a third embodiment of the solution according to the invention through centering at one of the connecting components. Also here the cut out from the torque transmission device 1 is illustrated again as depicted in FIG. 1.

The devices 10 in FIG. 11 include a centering in a radial direction in the portion of the outer circumference of the axial bearing 2 or outside through an extension of one of the axial bearing rings, thus of the axial bearing ring AR1 in radial direction in the portion outside of the axial bearing 2. The centering is performed in FIG. 11 at the turbine shell disc 25 or at an element connected torque proof therewith in particular ears 42 formed at the turbine shell disc in radial direction. By comparison FIG. 12 illustrates a centering in a portion of the inner circumference or within the inner circumference of the axial bearing 2 at a connecting component, in particular at the damper hub 23. For axial securing a securing element can be mounted axially at adjacent at the axial bearing 2 towards the hub, which however is not illustrated herein in detail.

FIG. 13 illustrates an additional third variant of the third embodiment with an additional centering element 43, wherein the centering's for preceding variants are integrally configured at one or the components. The additional centering element 43 is configured herein in the form of a centering plate. The centering plate is fitted between the axial bearing 2 and a connecting element, thus the intermediary space 41 between the damper component 4.1 and the damper hub 23, so that radial support is provided. In the illustrated situation the centering element 43 is pressed in on the radial inside at the axial bearing race AR1 or in a connecting element at the axial bearing ring AR1, or alternatively pressed into the intermediary space between the disc shaped component S1 and the damper hub 23. Alternatively the centering element can also be connected with one of the components through form locking.

In the illustrated embodiment the centering element 43 forms radial surfaces 44.1 for supporting at support surfaces 27 at the side disc 9 which is formed by a surface at an inner circumference. Furthermore the centering element 43 forms radial surfaces 44.2 for interaction with radial surfaces 28 at the axial bearing 2.

The illustrated embodiments are preferred configurations of the invention whose scope, however, is not limited thereto and includes embodiments which use the core inventive concept.

REFERENCE NUMERALS AND DESIGNATIONS 1 torque transmission device
2 axial bearing
3 hydrodynamic torque converter
4 torsion vibration damper
4.1 damper component
4.2 damper component
5 torque transmission device
6 damping/coupling device
7 connecting component
8 side disc
9 side disc
9.1, 9.2 face
10 centering device
11 centering device
12 actuatable clutch device
12.1 clutch component
12.2 clutch component
13 disc support
14 disc support
15 friction surface bearing elements and/or friction surface forming elements
16 friction surface bearing elements and/or friction surface forming elements
17 actuation device
18 axial race
19 exterior race
20 axial material deflection
21 output flange
22 torque proof connection
23 damper hub
23.2 face of damper hub
24 contact surface
25 turbine shell disc
26 torque proof connection
27 radial support surface
28 radial surface
29 ear
30 pass through opening
31 form locking element
32 recess
33 attachment and connection elements
34 engagement device
35 support surface in circumferential direction
36 surface in circumferential direction
37 recess
38 axial rise/protrusion
39 connection
40 rivet element
41 intermediary space
42 ear
43 centering element 44.1, 44.2 surface
S1 disc shaped component
S2 disc shaped component
AR1 axial bearing race
AR2 axial bearing race
ARW rolling element of axial bearing
F free wheeling clutch
L stator shell
FN spring unit
R rotation axis
P pump shell
T turbine shell

What I claim is:

1. A hydrodynamic torque converter (3), comprising: a torsion vibration damper (4) and an axial bearing (2) disposed between a damper component (4.1) of the torsion vibration damper (4) or a turbine shell (T) of the hydrodynamic torque converter (3), the turbine shell connected with the damper component (4.1), and an adjacent connecting component (F); and devices (10) for centering the axial bearing in a radial direction, wherein the components (4.1, 9, 18) directly supported through the axial bearing (2) are configured as disc shaped components (S1, S2), wherein a centering device (11) for centering the axial bearing (2) is configured at least at one of the disc shaped components (S1, S2);

wherein a particular centering device (11) includes a centering unit (11.1) configured at the disc shaped component (S1, S2) and a centering unit (11.2) configured in a complementary manner at the axial bearing (2);

wherein the centering unit (11.1) configured at the disc shaped component (S1, S2) includes a radial support surface (27) extending over a partial portion of the disc shaped component (S1, S2) in a circumferential direction, and the centering unit (11.2) configured at the axial bearing (2) includes a radial surface (28) oriented towards the radial support surface (27) and configured at the axial bearing (2), and/or the centering unit (11.1) configured at the disc shaped component (S1, S2) includes a support surface (35) oriented in circumferential direction at the disc shaped component (S1, S2), and the centering unit (11.2) configured at the axial bearing (2) includes a surface (36) oriented towards the support surface (35) and configured at the axial bearing (2); and, wherein the centering unit (11.1, 11.2) formed at the disc shaped component (S1, S2) or at the axial bearing (2) is formed by an axial material deflection (20), in particular an ear (29) or a pass through (30).

* * * * *